US006961409B2

(12) United States Patent
Kato (10) Patent No.: US 6,961,409 B2
(45) Date of Patent: Nov. 1, 2005

(54) TELECOMMUNICATION TERMINAL EQUIPMENT RESPONDING WITH ELECTRONIC MAIL CONTAINING SCHEDULE AND RESPONSE METHOD USING ELECTRONIC MAIL CONTAINING SCHEDULE

(75) Inventor: Kenichi Kato, Shizuoka (JP)

(73) Assignee: NEC Corporation, Tokyo (JP)

( * ) Notice: Subject to any disclaimer, the term of this patent is extended or adjusted under 35 U.S.C. 154(b) by 450 days.

(21) Appl. No.: 10/145,887

(22) Filed: May 16, 2002

(65) Prior Publication Data

US 2002/0172340 A1 Nov. 21, 2002

(30) Foreign Application Priority Data

May 21, 2001 (JP) ........................................ 2001-151157

(51) Int. Cl.[7] ............................................ H04M 11/00
(52) U.S. Cl. ................................ 379/88.13; 379/88.17; 379/900
(58) Field of Search ........................... 379/88.11, 88.13, 379/88.17, 88.19, 201.01, 210.01, 211.01, 900

(56) References Cited

U.S. PATENT DOCUMENTS

| 6,526,274 | B1 | * | 2/2003 | Fickes et al. | ............ | 455/414.1 |
| 6,622,021 | B1 | * | 9/2003 | Takala | ......................... | 455/466 |
| 6,640,230 | B1 | * | 10/2003 | Alexander et al. | ............ | 707/10 |
| 6,760,728 | B1 | * | 7/2004 | Osborn | ........................ | 707/10 |

FOREIGN PATENT DOCUMENTS

| EP | 0 783 219 A2 | 7/1997 |
| EP | 0 921 670 A2 | 6/1999 |
| GB | 2 362 788 A | 11/2001 |
| GB | 2 371 171 A | 7/2002 |
| JP | 7-58845 A | 3/1995 |
| JP | H08-097902 A | 4/1996 |
| JP | 9-219742 A | 8/1997 |
| JP | H09-261322 A | 10/1997 |
| JP | 9-321898 A | 12/1997 |
| JP | H10-023134 A | 1/1998 |
| JP | H10-124464 A | 5/1998 |
| JP | H10-136080 A | 5/1998 |
| JP | 11-17802 A | 1/1999 |
| JP | H11-017839 A | 1/1999 |
| JP | 11-88526 A | 3/1999 |
| JP | H11-088526 A | 3/1999 |
| JP | 11-220548 A | 8/1999 |
| JP | 11-239211 A | 8/1999 |
| JP | 2000-232529 A | 8/2000 |
| JP | 2000-278399 A | 10/2000 |
| JP | 2000-295366 A | 10/2000 |
| JP | 2001-125780 A | 5/2001 |
| JP | 2001-127899 A | 5/2001 |
| WO | WO 99/53699 A2 | 10/1999 |
| WO | WO 01/35229 A1 | 5/2001 |

* cited by examiner

Primary Examiner—Bing Q. Bui
(74) Attorney, Agent, or Firm—Sughrue Mion, PLLC (57) ABSTRACT

If there is an incoming voice call to a telecommunication terminal equipment, a response cannot be instantly made to the call and a caller's telephone number and an electronic mail address associated with the caller's telephone number are registered with a telephone directory, then a document prepared in advance and a document automatically formed out of latest schedule data and time are automatically transmitted to the electronic mail address over electronic mail. Therefore, the latest schedule data of a called person is transmitted as a part of a content of a transmitted voice message or a content of document information and a caller can be notified of information.

2 Claims, 7 Drawing Sheets

| 301a | REGISTRATION NUMBER | 001 | | | |
|---|---|---|---|---|---|
| 301b | NAME | NIHON, TARO | | | |
| 301c | TELEPHONE NUMBER 1 | 09011111111 | ASSOCIATION INFORMATION | 1 | 301g |
| 301d | TELEPHONE NUMBER 2 | 0322222222 | ASSOCIATION INFORMATION | 2 | 301h |
| 301e | ELECTRONIC MAIL ADDRESS 1 | taro@keitai.ne.jp | ASSOCIATION INFORMATION | 1 | 301i |
| 301f | ELECTRONIC MAIL ADDRESS 2 | taro@pasokon.com | ASSOCIATION INFORMATION | 2 | 301j |

| 302a | REGISTRATION NUMBER | 002 | | | |
|---|---|---|---|---|---|
| 302b | NAME | TOKYO, JIRO | | | |
| 302c | TELEPHONE NUMBER 1 | 0344444444 | ASSOCIATION INFORMATION | 0 | 302g |
| 302d | TELEPHONE NUMBER 2 | 07033333333 | ASSOCIATION INFORMATION | 1 | 302h |
| 302e | ELECTRONIC MAIL ADDRESS 1 | jiro@phs.ne.jp | ASSOCIATION INFORMATION | 1 | 302i |
| 302f | ELECTRONIC MAIL ADDRESS 2 | | ASSOCIATION INFORMATION | 0 | 302j |

| 303a | REGISTRATION NUMBER | 003 | | | |
|---|---|---|---|---|---|
| 303b | NAME | SABURO, KANAGAWA | | | |
| 303c | TELEPHONE NUMBER 1 | 09055555555 | ASSOCIATION INFORMATION | 0 | 303g |
| 303d | TELEPHONE NUMBER 2 | 0366666666 | ASSOCIATION INFORMATION | 0 | 303h |
| 303e | ELECTRONIC MAIL ADDRESS 1 | sabu@keitai.np.jp | ASSOCIATION INFORMATION | 0 | 303i |
| 303f | ELECTRONIC MAIL ADDRESS 2 | sabuchan@jitaku.com | ASSOCIATION INFORMATION | 0 | 303j |

FIG.5

EXAMPLE OF ELECTRONIC MAIL DOCUMENT PREPARED IN ADVANCE — 501

TO MR. TARO, NIHON

THANK YOU FOR YOUR CALLING.
I AM SORRY THAT I CANNOT ANSWER
THE PHONE RIGHT NOW.

COULD YOU LEAVE A MESSAGE IN AN
ANSWER PHONE?
IF YOU WOULD SEND AN ELECTRONIC
MAIL TO THE FOLLOWING ADDRESS,
I CAN CHECK YOUR ELECTRONIC MAIL LATER.

SINCERELY YOURS,

SHIRO, YOKOHAMA

ELECTRONIC MAIL: YOKOHAMA@KEITAI.NE.JP

TEL: 090-7777-7777

EXAMPLE OF DOCUMENT FORMED OUT OF SCHEDULE DATA AND DATE/TIME INFORMATION (EXAMPLE OF ELECTRONIC MAIL DOCUMENT TRANSMITTED IN RESPONSE TO CALL BETWEEN 14:00 AND 15:00) — 502

TO MR. TARO, NIHON

THANK YOU FOR YOUR CALLING.
I AM SORRY THAT I CANNOT ANSWER
THE PHONE RIGHT NOW.

COULD YOU LEAVE A MESSAGE IN AN
ANSWER PHONE?
IF YOU WOULD SEND AN ELECTRONIC
MAIL TO THE FOLLOWING ADDRESS,
I CAN CHECK YOUR ELECTRONIC MAIL LATER.

MY SCHEDULE IS AS FOLLOWS
  14:00 TO 15:00    MEET A VISITOR
  15:00 TO 16:00    MEETING

SINCERELY YOURS,

SHIRO, YOKOHAMA

ELECTRONIC MAIL: YOKOHAMA@KEITAI.NE.JP

TEL: 090-7777-7777

EXAMPLE OF SCHEDULE DATA — 504

| DATE | START TIME | END TIME | | SCHEDULE |
|------|-----------|----------|---------|----------|
| 2/2 | 11:00 | 12:00 | MEETING | MEETING ON PROGRESS OF PROJECT A |
| 2/2 | 13:00 | 14:00 | MEETING | MEETING ON PROGRESS OF PROJECT B |
| 2/2 | 14:00 | 15:00 | MEET VISITOR | MR. XX OF ○○ COMPANY |
| 2/2 | 15:00 | 16:00 | MEETING | MEETING ON PROGRESS OF PROJECT B |
| 2/3 | 10:00 | 17:00 | BUSINESS TRIP | △△ BRANCH OFFICE |
| 2/5 | 9:00 | 10:00 | MEETING | MEETING ON PROGRESS OF PROJECT A |
| 2/5 | 15:00 | 16:00 | HAVE A VISITOR | MR. ▽▽ OF □□ COMPANY |

TELECOMMUNICATION TERMINAL EQUIPMENT RESPONDING WITH ELECTRONIC MAIL CONTAINING SCHEDULE AND RESPONSE METHOD USING ELECTRONIC MAIL CONTAINING SCHEDULE

BACKGROUND OF THE INVENTION

1. Field of the Invention

The present invention relates to a telecommunication terminal equipment to be used in telecommunication which provides a service for notifying a receiver of a call of a caller's telephone number, and to a response method by an electronic mail.

2. Description of the Related Art

Figure 6:
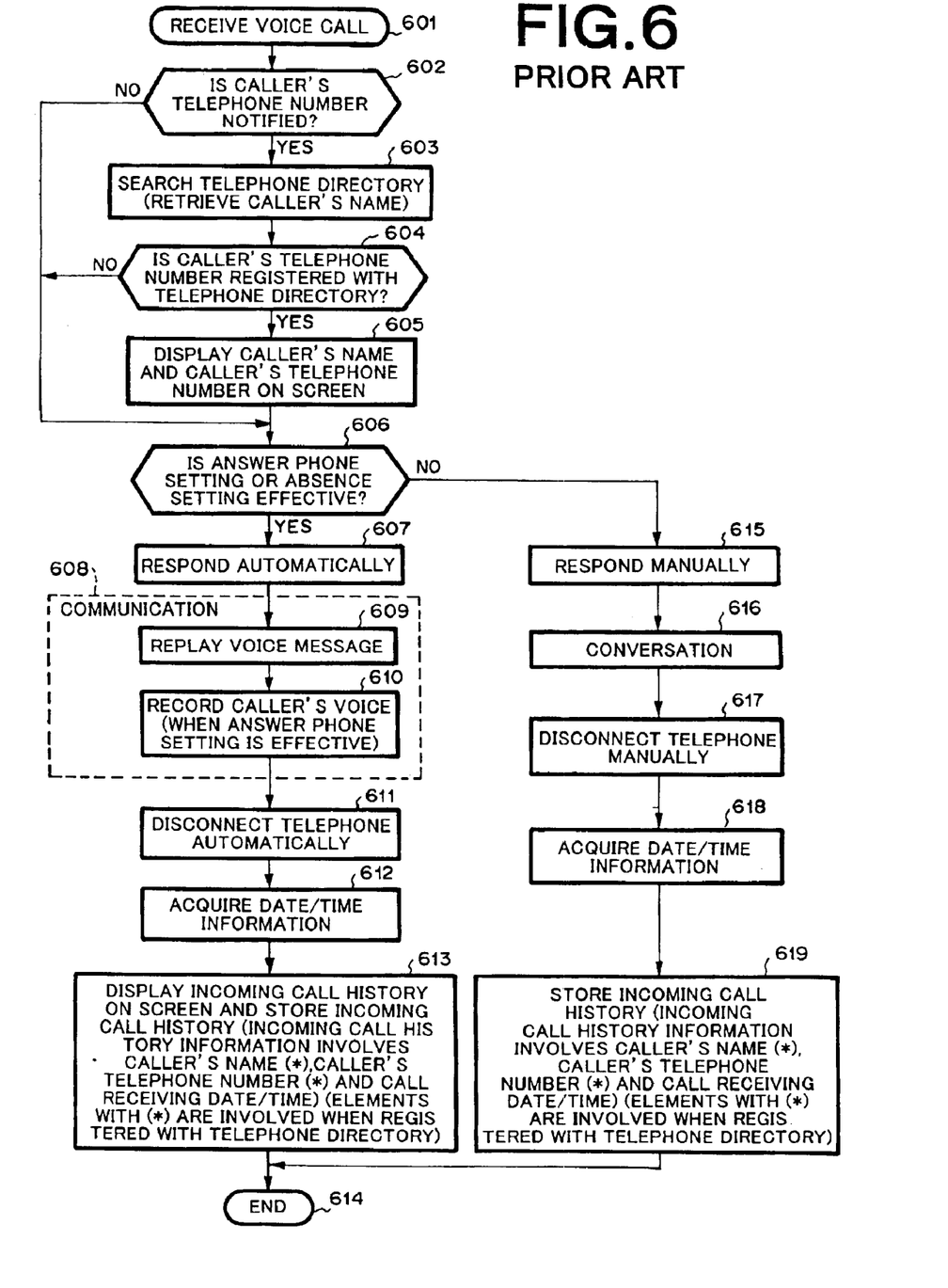
FIG. 6 is an explanatory view for the operation of a conventional telecommunication terminal equipment.

The operation of a conventional telecommunication terminal equipment will be described with reference to FIG. 6.

The conventional telecommunication terminal equipment has an answer phone function as disclosed in Japanese Patent Application Laid-Open No. 9-219742 and a telephone directory function as disclosed in Japanese Patent Application Laid-Open No.2000-278399.

If there is an incoming voice call to the conventional telecommunication terminal equipment (601), it is examined whether or not a caller's telephone number is notified. If the caller's telephone number is notified ('yes' in 601), a telephone directory is searched with the caller's telephone number used as a search key (603).

If the caller's telephone number is registered with the telephone directory ('yes' in 604), the name and telephone number of the caller registered with the telephone directory are displayed on a screen (605).

If an answer phone setting or an absence setting is made ('yes' in 606), a response is automatically made to the incoming call (607). In addition, in a conversation established state (608), an answer phone response message such as "I cannot answer the phone right now. Please leave a message after a peep tone." or an absence response message such as "I cannot answer the phone right now. Please call me back later." is replayed (609). If the answer phone setting is made, the caller's voice is recorded (610).

After the conversation, the telephone is automatically disconnected (611) and telephone disconnection date/time is acquired from a calendar/clock section (612). The telephone number and name of the caller as well as the call incoming date/time are displayed on the screen and registered as incoming history (613).

As can be seen, the conventional telecommunication terminal equipment realizes the display and storage of the incoming history using the answer phone function and the telephone directory function.

As regards the answer phone function of the conventional telecommunication terminal equipment, a method of changing the content of an answer phone message according to a situation is disclose in Japanese Patent Application Laid-Open No. 11-17802.

The conventional telecommunication terminal equipment has an electronic mail function to allow transmitting and receiving character information as well as a voice conversation function. The display of the incoming history of the equipment is disclosed in Japanese Patent Application Laid-Open No. 2000-295366.

Further, Japanese Patent Application Laid-Open No. 11-88526 discloses the telecommunication terminal connecting to a telephone line as follows. A telecommunication terminal connecting to a telephone line is provided with a service for notifying a caller's telephone number. If a voice response cannot be instantly made to an incoming call, then an electronic mail address corresponding to the caller's telephone number previously registered is retrieved, a call is automatically made to the telephone number of a network access point, connection is established with the Internet service and a document is transmitted to the retrieved electronic mail address on the Internet service.

However, according to the conventional telecommunication terminal equipment, schedule data of a called person is not transmitted as a part of the content of the transmitted voice message or that of the document information. Due to this, it is unclear when to again call the called person. The conventional telecommunication terminal equipment has, therefore, a first disadvantage in that it is impossible to ensure that the caller can have conversation with the called person.

In addition, the conventional telecommunication terminal equipment has a third disadvantage in that no measures are taken if schedule data is changed.

SUMMARY OF THE INVENTION

To solve the first disadvantage, it is a first object of the present invention to provide a telecommunication terminal equipment capable of notifying a caller of information based on which a called person can respond to the caller.

To solve the second disadvantage, it is a third object of the present invention to provide a telecommunication terminal equipment capable of notifying a caller that schedule data of a called person is changed.

According to a first aspect of the present invention, there is provided a telecommunication terminal equipment responding with an electronic mail containing a schedule to a call, comprising: a memory for storing a telephone directory in which telephone numbers and electronic mail addresses are associated to each other; a memory for storing a schedule data; means for receiving a call; means for determining whether or not a telephone number is notified in the call; means for, if a telephone number is notified in the call, retrieving an electronic mail address corresponding to the telephone number from the telephone directory; means for obtaining a date and time when receiving the call; means for retrieving a schedule in a predetermined period starting from the date and time from the schedule data; and means for sending an electronic mail containing the schedule to the electronic mail address.

The telecommunication terminal equipment may further comprise: means for detecting a change of the schedule data; means for detecting persons to whom the electronic mails have been sent but with whom conversations on the equipment have not been had; and means for sending electronic mails containing the changed schedule to electronic mail addresses of the detected persons.

According to a second aspect of the present invention, there is provided a method for responding with an electronic mail containing a schedule to a call, comprising the steps of: providing a memory for storing a telephone directory in which telephone numbers and electronic mail addresses are associated to each other; providing a memory for storing a schedule data; receiving a call; determining whether or not a telephone number is notified in the call; if a telephone number is notified in the call, retrieving an electronic mail address corresponding to the telephone number from the telephone directory; obtaining a date and time when receiving the call; retrieving a schedule in a predetermined period starting from the date and time from the schedule data; and sending an electronic mail containing the schedule to the electronic mail address.

The method may further comprise the steps of: detecting a change of the schedule data; detecting persons to whom the electronic mails have been sent but with whom conversations on a telecommunication terminal equipment have not been had; and sending electronic mails containing the changed schedule to electronic mail addresses of the detected persons.

DESCRIPTION OF THE PREFERRED EMBODIMENTS

A first embodiment of the present invention will be described hereinafter with reference to FIG. 1 which shows the features of the present invention.

Figure 1:
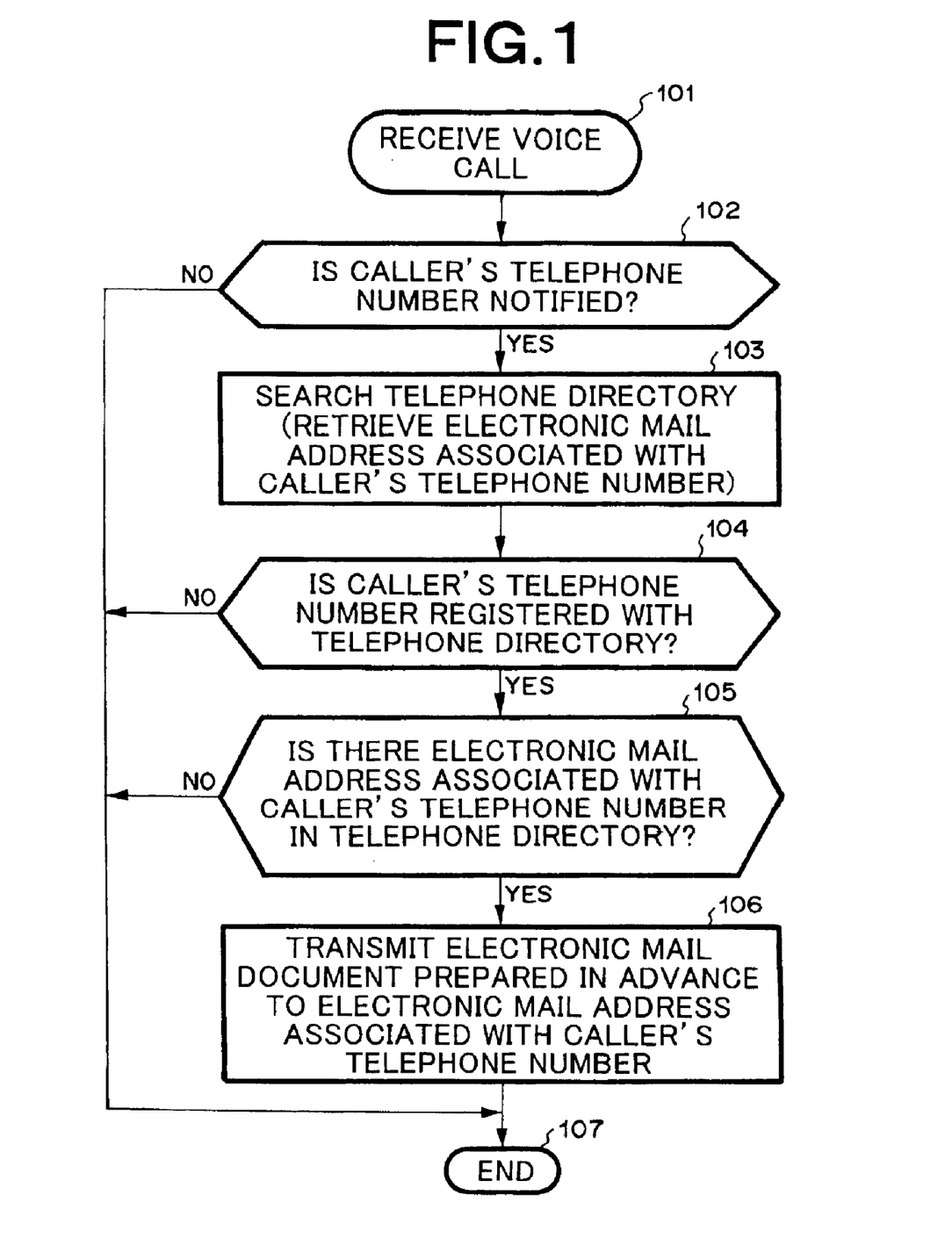
FIG. 1 is an explanatory view for the operation of a telecommunication terminal equipment in a first embodiment according to the present invention.

In FIG. 1, if there is an incoming voice call (101), it is examined whether or not a caller's telephone number is notified. If the caller's telephone number is notified ('yes' in 102), a telephone directory is searched with the caller's telephone number used as a search key (103). If the caller's telephone number is registered with the telephone directory ('yes' in 104) and an electronic mail address associated with the caller's telephone number is registered with the telephone directory ('yes' in 105), then a document containing the latest schedule data prepared in advance is automatically transmitted to the electronic mail address (106).

The present invention is assumed to be utilized if there is an incoming voice call from another telecommunication terminal equipment having an electronic mail function and a response cannot be made to the call, an electronic mail is automatically transmitted as in the case of the automatic voice response of the answer phone function or the like and thereby a document message is transmitted to a caller in response to the voice call. It is also possible to automatically transmit a voice response to an incoming electronic mail as an applied usage method of the present invention.

Figure 2:
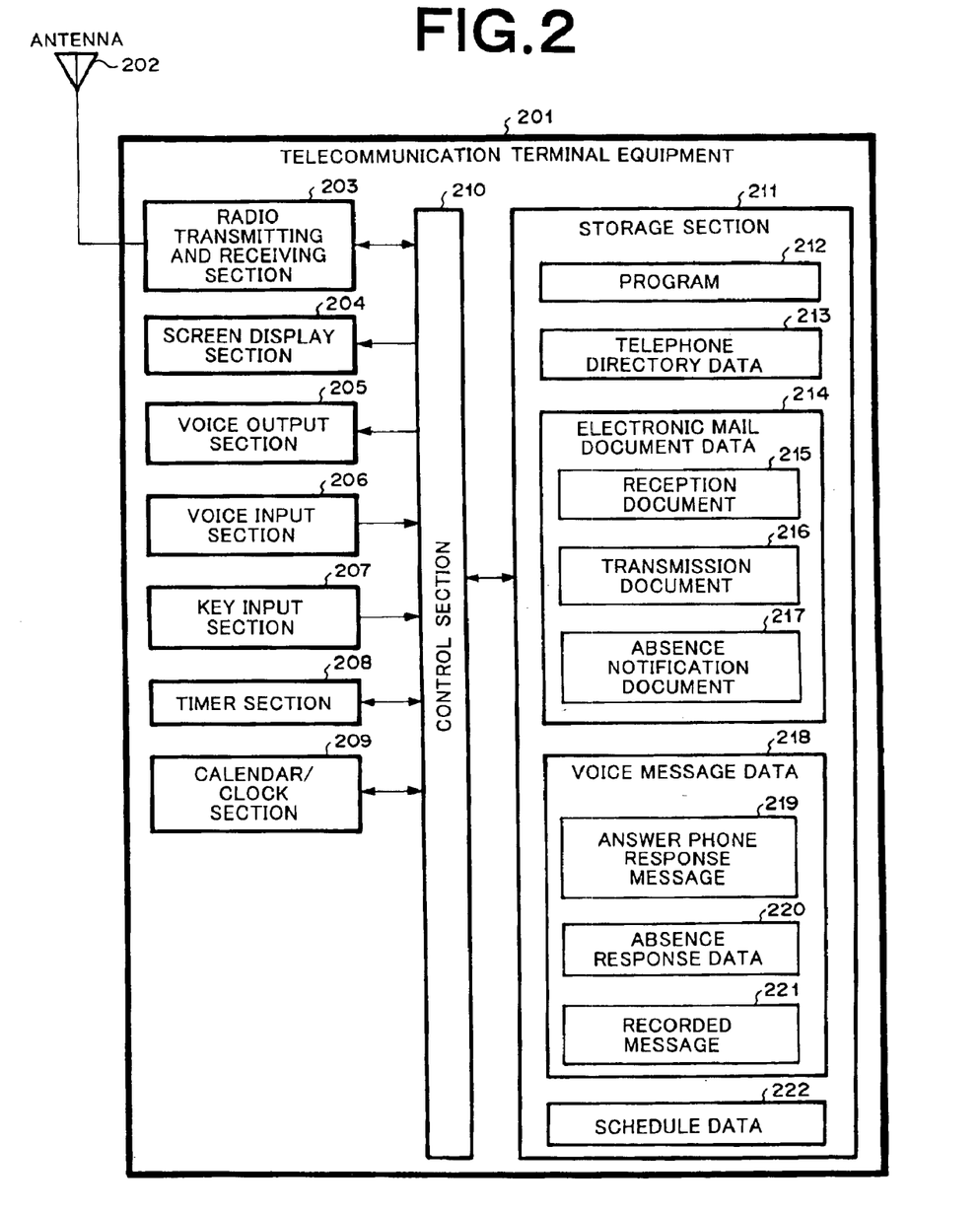
FIG. 2 is a block diagram of a telecommunication terminal equipment in the first embodiment.

The configuration of a telecommunication terminal equipment according to the present invention is shown in FIG. 2.

A telecommunication terminal equipment 201 of the present invention includes an antenna 202, a radio transmitting and receiving section 203, a screen display section 204, a voice output section 205, a voice input section 206, a key input section 207, a timer section 208, a calendar/clock section 209, a control section 210 and a storage section 211.

The storage section 211 registers a program 212 and various types of data which indicates data related to the present invention.

The various type of data involve telephone directory data 213, electronic mail document data 214, voice message data 218 and schedule data 222. The electronic mail document data 214 involves an absence notification document 217 characteristic of the present invention as well as a reception document 215 and a transmission document 216.

The voice message data 218 involves an answer phone response message 219, an absence response message 220 and a recorded message 221.

Figure 4A:
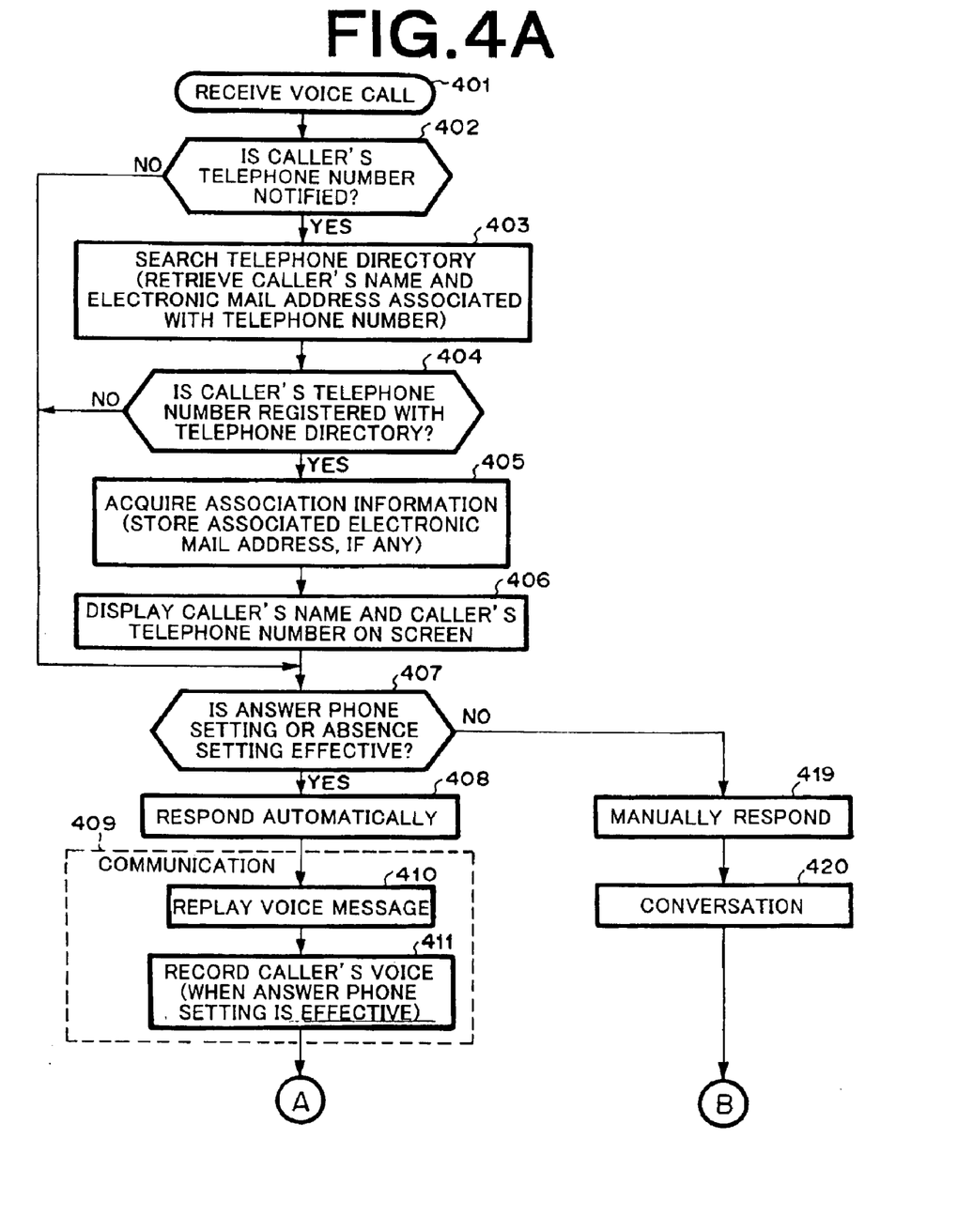
FIGS. 4A and 4B are an explanatory view for the operation of the embodiment in which the present invention is added to a conventional telecommunication terminal equipment which has an answer phone function and an incoming history function.

An example of adding the present invention to the conventional telecommunication terminal equipment which has an answer phone function and an incoming history function will be described with reference to FIGS. 4A and 4B.

If there is an incoming voice call to the telecommunication terminal equipment of the present invention (401), it is examined whether or not a caller's telephone number is notified. If the caller's telephone number is notified ('yes' in 402), a telephone directory is searched (403).

Figure 3:
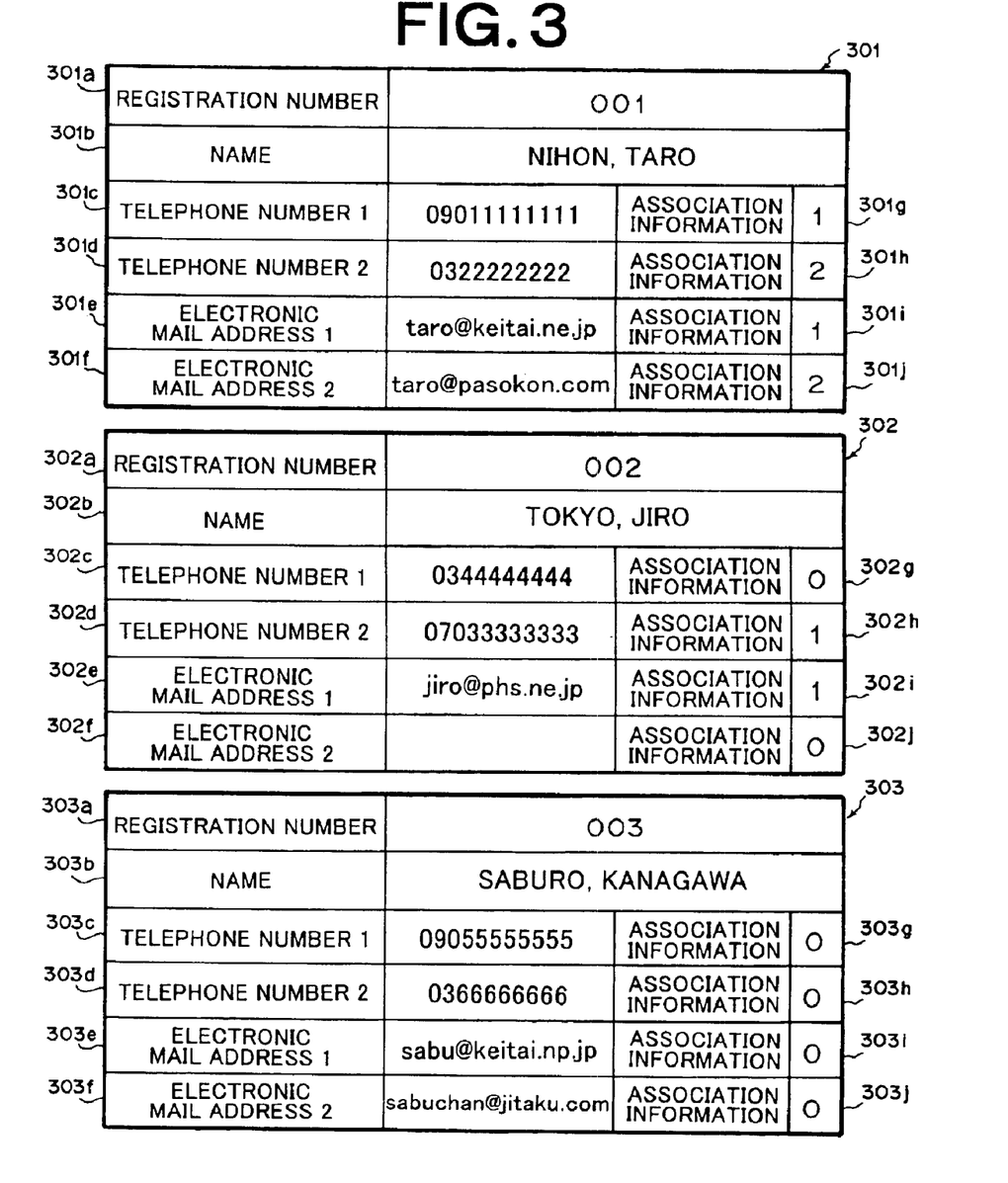
FIG. 3 is a block diagram of telephone directory data in a telecommunication terminal equipment in a second embodiment according to the present invention.

In this telephone directory search, blocks 301 to 303 shown in FIG. 3 are retrieved with the caller's telephone number used as a search key. If the caller's telephone number is registered with the telephone directory ('yes' in 404), association information is acquired (i.e., if there is an electronic mail address associated with the caller's telephone number, the electronic mail address is registered) (405). The caller's telephone number and a caller's name acquired from the telephone directory are displayed on a screen (406).

If an answer phone setting nor an absence setting is not made('no' in 407), a response is manually made to the call (419), a conversation is made (420), the telephone is manually disconnected (421), telephone disconnection date/time is acquired from the calendar/clock section (422), and the telephone number and name of the caller as well as call incoming date/time are displayed on the screen and registered as incoming history (423).

If an answer phone setting or an absence setting is made ('yes' in 407), a response is automatically made to the call (408) and a communication is established (409). In the communication established state, an answer phone response message such as "I cannot answer the phone right now. Please leave a message after a peep tone." or an absence response message such as "I cannot answer the phone right now. Please call me back later." is replayed (410). If the answer phone setting is made, the caller's voice is recorded (411).

After the communication, the telephone is automatically disconnected (412) and telephone disconnection date/time is acquired from the calendar/clock section (413). The telephone number and name of the caller as well as call incoming date/time are displayed on the screen and registered as incoming history (414). The display and registration of the caller's telephone number are made only if the caller's telephone number is notified when the call is received, and the display and registration of the caller's name are made only if the caller's name is registered with the telephone directory.

If an automatic electronic mail response setting is effective ('yes' in 415) and there is an electronic mail address associated with the caller's telephone number in the telephone directory ('yes' in 416), then a document prepared in advance and a document formed out of schedule data and date/time information are transmitted to the electronic mail address (417).

Figure 5:
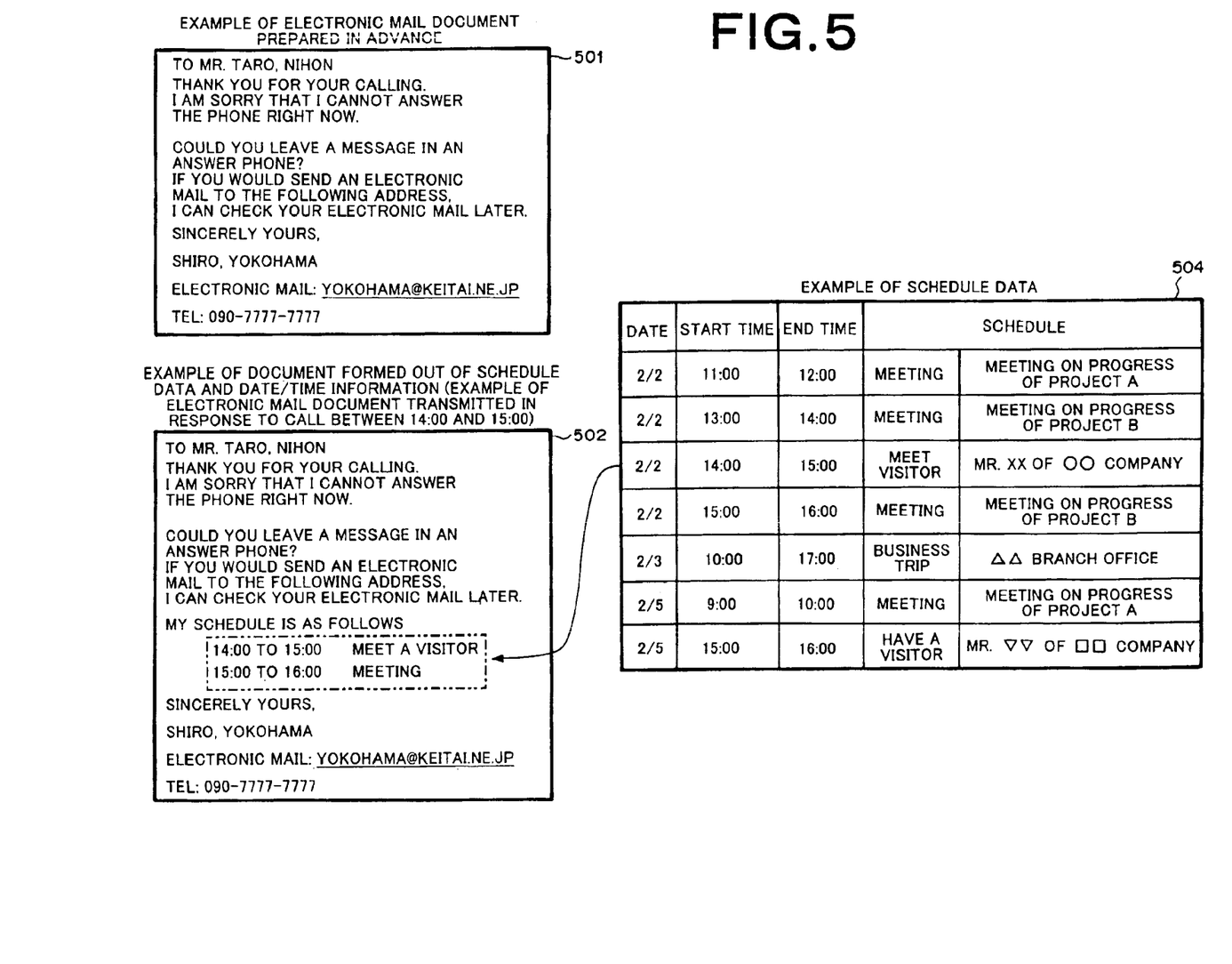
FIG. 5 shows an example of a document stored in advance and an example of a document formed out of schedule data and date/time.

An example of the document prepared in advance and an example of the document formed out of schedule data and date/time information are shown in FIG. 5.

The schedule data 504 is an example of the schedule data 222 shown in FIG. 2. The "example of the document prepared in advance" 501 is a document formed out of the content of the voice response message of a conventional answer phone.

The "example of the document formed out of the schedule data and the date/time information" 502 is obtained by adding schedule data of the called person to the "example of the document prepared in advance" 501. The schedule data is added so as to notify the caller of the reason why the called person cannot answer the phone, and the time when the caller can contact the called person or the like.

Figure 4B:
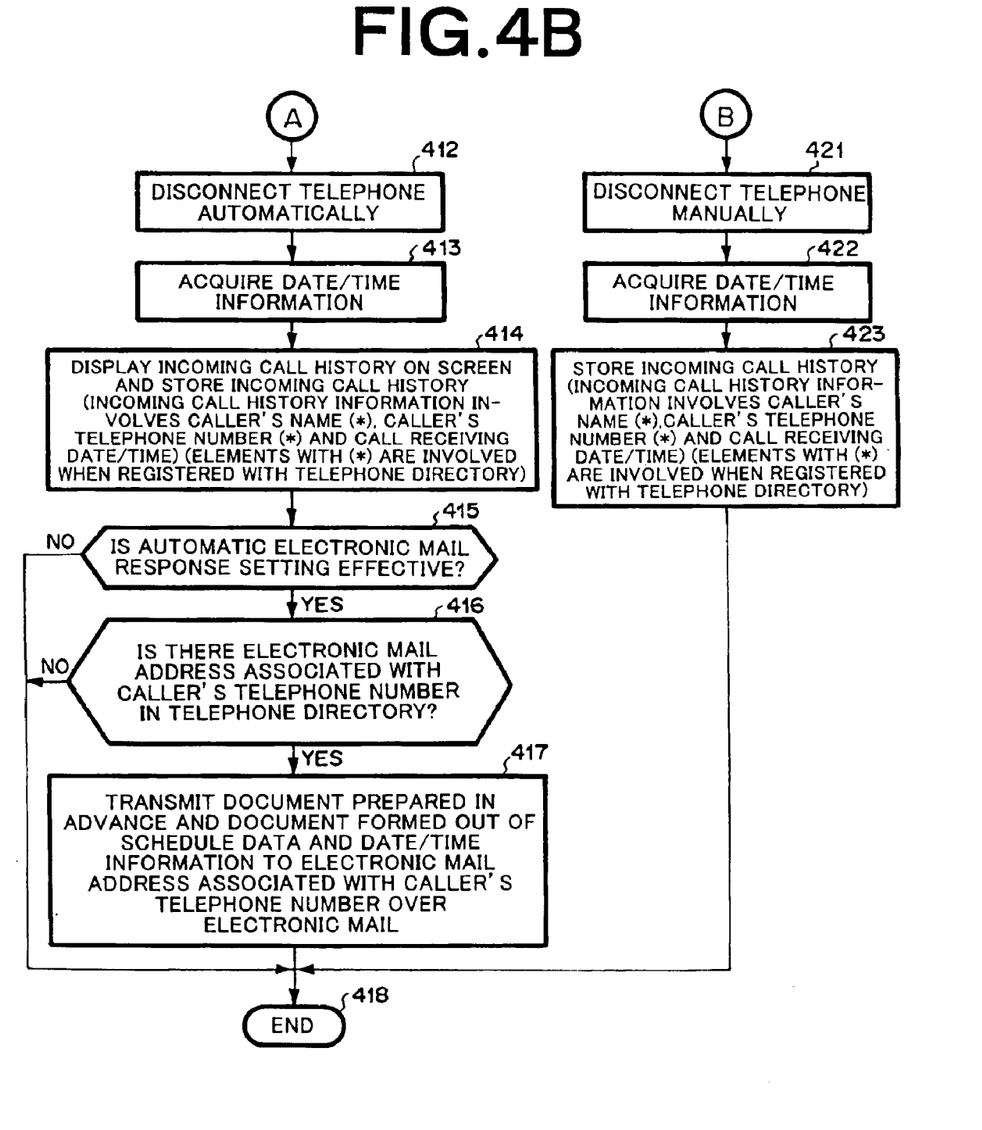

Schedule data 503 to be added is obtained by searching the schedule data 504 using, as a search key, incoming date/time obtained from the date/time information acquisition (413) shown in FIG. 4B and by automatically extracting necessary information.

A second embodiment of the present invention will next be described with reference to FIG. 3.

The content of the telephone directory data 213 on the telecommunication terminal equipment 201 is shown in FIG. 3.

The telephone directory data 213 is managed in units of blocks. FIG. 3 shows a case where data on three persons are stored in the telephone directory of the telecommunication terminal equipment in this embodiment. Three effective blocks, i.e., blocks 301, 302 and 303 are present in the telephone directory.

Each block consists of the same constituent elements. The block 301 will be typically described.

A "registration number" 301a stores a number unique to each block to manage the block, a "name" 301b stores the name of a caller of whom the data is stored in the block, a "telephone number 1" 302c and a "telephone number 2" 301d store the telephone numbers of the caller, respectively.

An "electronic mail address 1" 301e and an "electronic mail address 2" 301f store the electronic mail addresses of the caller, respectively and "association information" 301g to 301j store information which indicates the association of the telephone numbers to the electronic mail addresses, respectively, and which is characteristic of the present invention.

The "association information" 301g stores association information on the "telephone number 1" 301c, the "association information" 301h stores association information on the "telephone number 2" 301d, the "association information" 301i stores association information on the "electronic mail address 1" 301e, and the "association information" 301j stores association information on the "electronic mail address 2" 301f.

In the block 301, "1" is stored in the "association information" 301g and the "association information" 301i, respectively and "2" is stored in the "association information" 301h and the "association information" 301j, respectively.

This signifies that the "telephone number 1" 301c is associated with the "electronic mail address 1" 301e and that the "telephone number 2" 301d is associated with the "electronic mail address 2" 301f.

In the block 302, "1" is stored in the "association information" 302h and the "association information" 302i, respectively and "0" is stored in the "association information" 302g and the "association information" 302j, respectively.

This signifies that the "telephone number 2" 302d is associated with the "electronic mail address 1" 302e and that the "telephone number 1" 302c is not associated with any "electronic mail address".

In the block 303, "0" is stored in each of the "association information" 303g to 303j which signifies that there is no association between the telephone numbers and the electronic mail addresses.

A third embodiment of the present invention will next be described.

This embodiment treat a case where a schedule data is changed after an electronic mail notifying of the schedule before the change is transmitted to a caller and a conversation has not yet been made with the caller. According to this embodiment, a new electronic mail notifying of the changed schedule is transmitted to the caller in such a case.

The telecommunication terminal equipment includes a call-in and call-out history storage section, a voice conversation history storage section, an electronic mail response history storage section as well as the telephone directory function, the voice conversation function, the electronic mail function and the schedule data storage section of the present invention. A caller's telephone number and a date/time when a conversation ended are stored in the voice conversation history section (the fourth storage section storing a voice conversation history).

The electronic mail response history storage section (the fifth storage section storing the history of a caller to which a response was made over electronic mail) registers a caller's electronic mail address to which an electronic mail containing schedule data was transmitted when the call was received from the caller and a transmission date/time history. However, if a voice conversation is held with the same caller at least once after the electronic mail was transmitted, the electronic mail response history corresponding to the caller is erased.

A method of erasing the electronic mail response history when a voice conversation is held with the same caller after the electronic mail was transmitted to the caller will be described hereinafter in detail.

After the completion of the voice conversation, the telephone number of the caller with whom the voice conversation has been held is retrieved from the telephone numbers registered with the telephone directory by means of the telephone directory function.

Next, if the caller's telephone number is found to be registered with the telephone directory, an electronic mail address group A registered with the same block as the caller's telephone number is retrieved.

Thereafter, electronic mail addresses C in the electronic mail address group A is successively extracted and the same electronic mail addresses as the electronic mail addresses C are retrieved, using the electronic mail addresses C as search keys, from an electronic mail address group B which is registered with the electronic mail response history storage section along with transmission date/time group B.

If the same electronic mail addresses as the electronic mail addresses C are retrieved, the electronic mail address group A and a transmission date/time group A are erased from the electronic mail address group B and the transmission date/time group B in the electronic mail response history storage section, respectively, and the electronic mail response history storage section is made to be consisting of a remaining electronic mail address group D and a transmission date/time group D.

Next, an operation in a case where schedule data in the schedule data storage function is changed and the change is registered will be described.

If schedule data in the schedule data storage section is changed and the change is registered, the electronic mail address group D and the transmission date/time group D are retrieved from the electronic mail response history storage section.

If the electronic mail address group D is retrieved, schedule data within predetermined period from the date/time when the schedule data is changed is retrieved from the whole schedule data using the date/time as a search key. A document prepared in advance and the retrieved schedule data are edited into a document and each electronic mail address in the electronic mail address group D is added to the edited document. The edited document is transmitted as a response to a caller with whom no voice conversation has been held after an electronic mail was transmitted thereto, and the transmission date/time group D in the response history storage section is updated.

A first advantage of the present invention is in that a recipient who receives an electronic mail can be informed of the latest schedule of an absentee by a response over the electronic mail transmitted from the absentee.

A second advantage is that a first person who called a second person who was absent is able to call the second person when it is known that the second person can respond, and therefore, wasteful traffic is prevented.

A third advantage of the present invention is in that if a caller holds a plurality of telephone numbers and a plurality of electronic mail addresses, the electronic mail addresses can be set so as to correspond to the respective telephone numbers by the telephone directory data management function of the present invention, thereby facilitating dealing with the change of the telephone number and the addition of a new telephone number and the change of the electronic mail address and the addition of a new electronic mail address.

A fourth advantage of the present invention is in that a document always edited from the latest schedule data is automatically notified to a caller for whom the notification is determined to be necessary, over electronic mail.

What is claimed is:

1. A telecommunication terminal equipment responding with an electronic mail containing a schedule to a call, comprising:

a memory for storing a telephone directory in which telephone numbers and electronic mail addresses are associated to each other;

a memory for storing a schedule data;

means for receiving a call;

means for determining whether or not a telephone number is notified in said call;

means for, if a telephone number is notified in said call, retrieving an electronic mail address corresponding to said telephone number from said telephone directory;

means for obtaining a date and time when receiving said call;

means for retrieving a schedule in a predetermined period starting from said date and time from said schedule data;

means for sending an electronic mail containing said schedule to said electronic mail address;

means for detecting a change of said schedule data;

means for detecting persons to whom said electronic mails have been sent but with whom conversations on the equipment have not been had; and means for sending electronic mails containing the changed schedule to electronic mail addresses of the detected persons.

2. A method for responding with an electronic mail containing a schedule to a call, comprising the steps of:

providing a memory for storing a telephone directory in which telephone numbers and electronic mail addresses are associated to each other;

providing a memory for storing a schedule data;

receiving a call;

determining whether or not a telephone number is notified in said call;

if a telephone number is notified in said call, retrieving an electronic mail address corresponding to said telephone number from said telephone directory;

obtaining a date and time when receiving said call;

retrieving a schedule in a predetermined period starting from said date and time from said schedule data;

sending an electronic mail containing said schedule to said electronic mail address;

detecting a change of said schedule data;

detecting persons to whom said electronic mails have been sent but with whom conversations on a telecommunication terminal equipment have not been had; and sending electronic mails containing the changed schedule to electronic mail addresses of the detected persons.

* * * * *